United States Patent [19]

Puyplat

[11] Patent Number: 4,947,016
[45] Date of Patent: Aug. 7, 1990

[54] METHOD AND APPARATUS FOR DUPLICATING STEEL INTAGLIO PRINT ELEMENTS USING ELECTRO-EROSION MACHINING

[75] Inventor: Olivier Puyplat, Paris, France

[73] Assignee: Banque de France, Puteaux, France

[21] Appl. No.: 287,408

[22] Filed: Dec. 20, 1988

[30] Foreign Application Priority Data

Dec. 21, 1987 [FR] France ............................ 87 17815

[51] Int. Cl.$^5$ .................. B23H 7/00; B23H 9/06
[52] U.S. Cl. .................. 219/69.17; 219/69.2; 204/6; 204/189.5
[58] Field of Search .............. 204/3, 4, 5, 6, 11, 204/129.2, 129.5, 129.7; 219/69.15, 69.17, 69.2

[56] References Cited

U.S. PATENT DOCUMENTS

| | | | |
|---|---|---|---|
| 3,574,075 | 4/1971 | Eccles | 204/6 |
| 3,796,851 | 3/1974 | Pfaff, Jr. | 219/69.2 |
| 4,098,652 | 7/1978 | Koenig | 204/4 |
| 4,337,385 | 6/1982 | Maropis et al. | 219/69.2 |
| 4,792,654 | 12/1988 | Trujillo | 219/69.2 |

FOREIGN PATENT DOCUMENTS

| | | | |
|---|---|---|---|
| 837814 | 1/1978 | Belgium. | |
| 45-13800 | 5/1970 | Japan | 219/69.16 |
| 45-14480 | 5/1970 | Japan | 219/69.16 |
| 55-48527 | 4/1980 | Japan | 219/69.15 |
| 55-65032 | 5/1980 | Japan | 219/69.17 |
| 56-76342 | 6/1981 | Japan | 204/3 |

*Primary Examiner*—A. D. Pellinen
*Assistant Examiner*—Geoffrey S. Evans
*Attorney, Agent, or Firm*—Mason, Kolehmainen, Rathburn & Wyss

[57] ABSTRACT

The invention relates to duplicating intaglio print elements in steel by using an engraved copper art model as a template for a copper electrode which in turn is utilized in an electro-erosion machining process to produce the steel workpieces. The invention is particularly applicable to making intaglio print elements for printing on bank note paper and more particularly for printing paper money.

13 Claims, 2 Drawing Sheets

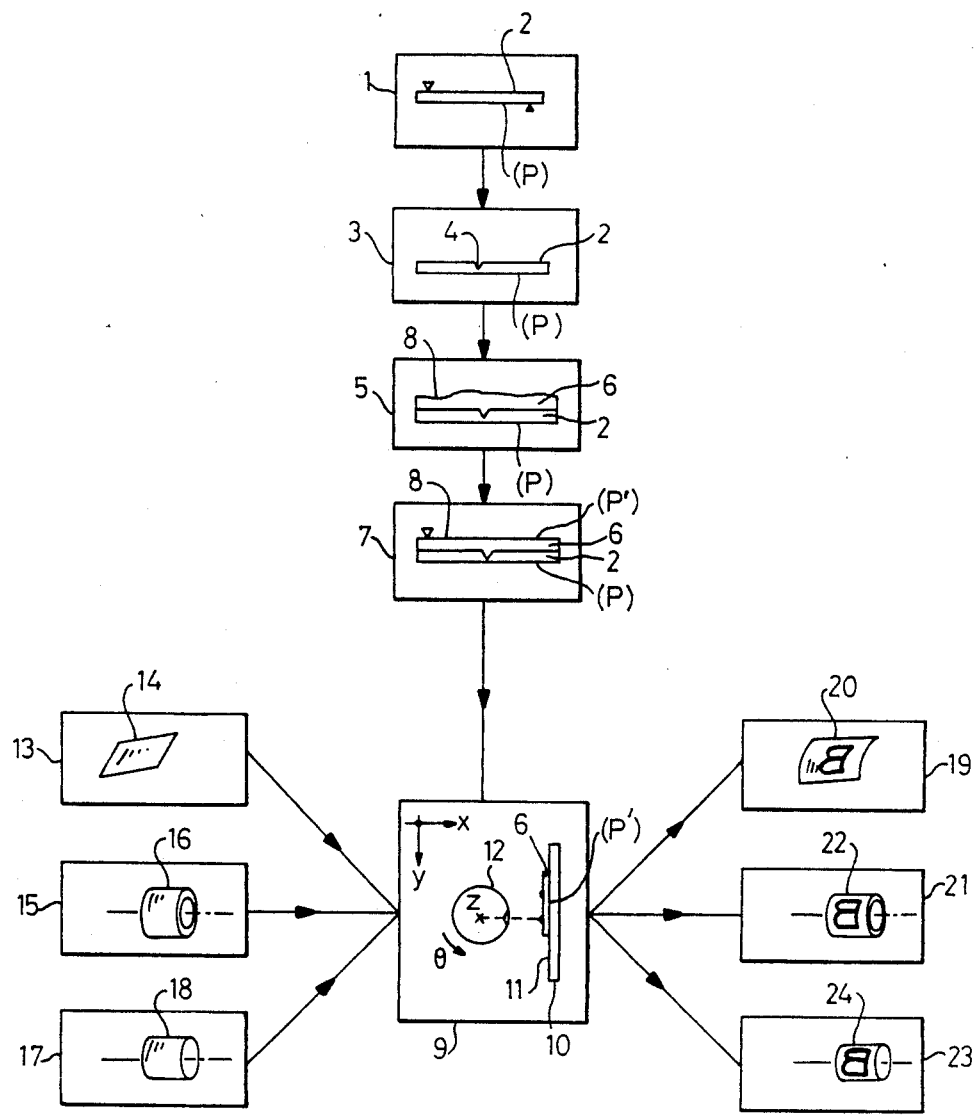
FIG_1

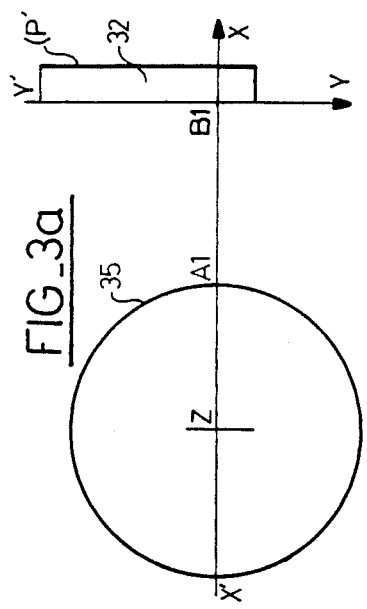
FIG_3a
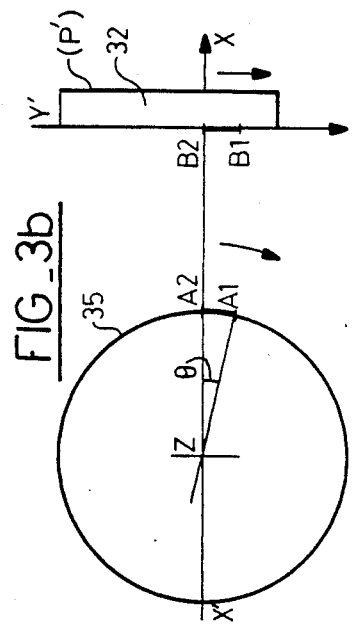
FIG_3b
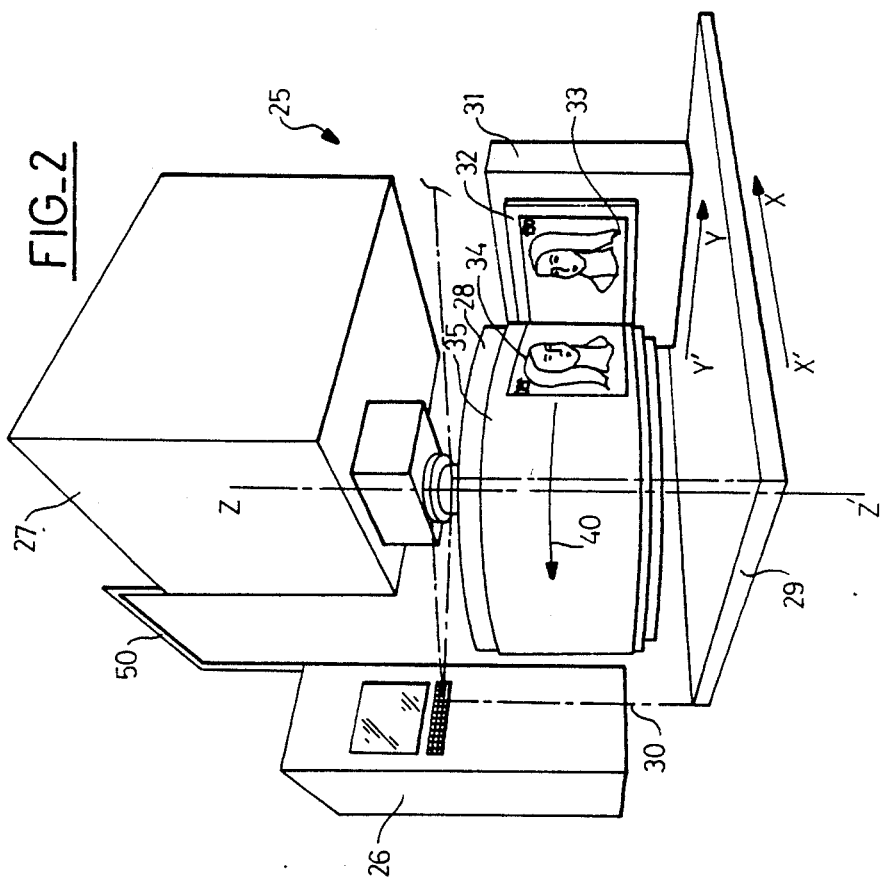
FIG_2

METHOD AND APPARATUS FOR DUPLICATING STEEL INTAGLIO PRINT ELEMENTS USING ELECTRO-EROSION MACHINING

The field of the present invention is printing, and more particularly it relates to intaglio print elements for use with banknote paper, and in particular for printing paper money.

BACKGROUND OF THE INVENTION

Intaglio printing is a method of printing using depressions enabling thick layers of ink to be deposited on paper, and industrial scale intaglio printing has long been used for stamping, for printing postage stamps, and for printing on banknote paper. In this technique, the print element (a plate or a cylinder) includes engraved depressions made by means of a graving tool and/or by etching, with the depths of the depressions generally being proportional to their widths and lying in the range 0 to 300 microns, said depressions serving to retain ink which is subsequently transferred to the paper.

At present, print elements for printing on banknote paper are made by electroforming, generally using nickel, together with a final layer of chromium plate for surface protection.

The original master is then a plate known as an "art-model" which is generally made of copper. This plate is engraved by etching and/or by graving tools (and often by both techniques). The engraved artmodel is used for making electroformed nickel print elements which are electroplated with chromium.

The manufacturing process then continues as explained below for plates and cylinders for multi-image printing.

The artmodel is reproduced in as many copies as are required by hot pressure molding in a plastic material (generally polyvinyl chloride). By way of example, it is common practice to use a sheet of 1 millimeter thick polyvinyl chloride and to form molds therein in a press by applying pressure between two plates heated to 100° C. and then allowing them to cool under pressure down to ambient temperature. The average duration of a single cycle is about 20 minutes.

Thereafter, the plastic molds are assembled in a temperature controlled room in order to avoid unwanted variations in dimensions. The molds are assembled to each other by gluing or by high frequency welding, and they are located relative to one another as accurately as possible (to within a few hundredths of a millimeter), generally by means of devices including stepper motors (with three reference axes, x, y, and z, and with rotation about the z-axis).

In a first case, the purpose is to make a printing plate which is then wound around a plate-carrying cylinder.

In this case, the multi-mold plastic assembly is rendered electrically conductive by stannous chloride activation and by spraying with two solutions: a solution of silver nitride and ammonia; and a reducing solution of hydrazine. The assembly is then placed in a bath of nickel sulfamate electrolyte at 40° C. (without chlorine in order to avoid shrinkage) in order to obtain a 1.2 mm thick nickel replica thereof by electroforming for a period of 48 hours. This plate is rectified to a thickness of 0.8 mm and then has a 5 micron thick layer of chromium plating applied thereto in order to harden its surface. The result is a printing plate ready to be wound onto a cylinder. It would naturally be possible to replace the depositing of a very thin layer of silver by a vacuum metallization process, however that would be more complicated to implement and would suffer from the drawbacks due to the inevitable evolution of gas from the plastic material. The above-described technique is thus a kind of electrotype.

In a second case, the purpose is to make a print sleeve which is subsequently fitted on a steel shaft in order to constitute a print cylinder.

In this case, in order to obtain a multi-image nickel sleeve, the above-described assembly of multiple plastic molds, after being made electrically conductive as described above, is inserted in a hollow cylinder constituted by two bronze half-shells. The assembly is placed in a bath of nickel sulfamate electrolyte for three weeks in order to electroform a layer which is 12 mm thick. While still in its bronze shell, the inside of the nickel sleeve is then machined on a lathe in order to obtain constant thickness. It is then removed from the shell and its surface is hardened by 5 microns of chromium plating. The result is a print sleeve ready to be fitted to a shaft.

To complete the picture, it is recalled that there also exists a third case in which the purpose is to make a solid print cylinder, as is used for printing postage stamps. In this case, a milling machine is used in order to obtain a print cylinder bearing the one hundred or the four hundred identical images in the form of depressions This method uses pressure transfer and would not be suitable for printing on banknote paper by virtue of the large areas and depths of the depressions required In order to obtain a good understanding of the drawbacks presented by nickel print elements (plates or sleeves) obtained by electroforming, it is appropriate to briefly recall the general principles of intaglio printing as conventionally used for printing on banknote paper.

The plate (or sleeve) is mounted on the printing cylinder of a printing press. The cylinder is inked over its entire surface by an inking roll, using a technique which is conventional in printing. Immediately after being inked, a fixed blade or a counter-rotating cylinder fitted with a scraper or with a strip which is itself scraped then removes the ink from the plate (or from the sleeve) leaving ink only in the engraved depressions. Immediately after being scraped, the plate or sleeve is wiped either by means of a strip of paper or else by being sprinkled or brushed with alkali water (water containing about 2% sodium hydroxide and a wetting agent), with said wiping serving to remove all traces of ink from the outside surface of the plate or the sleeve. Thereafter the paper is pressed against the print element by a pressure cylinder which is typically made up of plates of cotton cloth which are clamped under high pressure and filled with a resin (generally polyurethane), and whose outside surface is rectified on a lathe. It is important to observe that the pressure may be as much as one (metric) ton per linear cm. The paper is thus deformed over the depressions from which it picks up the ink. The resulting print is in relief, firstly because the paper is embossed and secondly because of the thickness of the ink unmolded from the depressions.

The first drawback of conventional print elements lies in the rapid wear to which they are subject.

Factors contributing to element wear are ink scraping, paper wiping, and the high levels of pressure used. In spite of the chromium, print elements become worn over periods of time which are unsatisfactory given the size of print runs used for printing paper money. Typically, plates are changed every 750,000 prints and sleeves are dismantled for removal of their chromium plating and for replating with chromium, once every million prints.

Another drawback lies in the need to chromium-plate the printing surfaces in order to obtain the required hardness: chromium plating requires difficult and lengthly operations to be performed and the cylinders need to be repeatedly dismantled.

Another drawback lies in the difficulty of obtaining the degree of polishing required when preparing the ink-receiving surface.

Thus, prior techniques for making intaglio print elements use soft metals that wear relatively quickly and they require difficult and expensive processes to be implemented.

It would naturally be tempting to be able to make print elements that do not wear out, by making them of a hard substance such as steel, for example, and therefore requiring no special maintenance.

However, reproducing engravings repetitively (multi-image printing) matching the original artmodel requires the use of a special mode of machining, since engraving by means of a hand-operated cutting tool is impossible given that the successive reproductions must all be true copies. It has not been possible in the past to engrave on an industrial scale by means of a mechanically operated cutting tool since the dimensional accuracy required is difficult to achieve at a cost/effectiveness ratio that is compatible with realistic industrial operation.

The object of the present invention is to provide a rational and satisfactory method of making a series of intaglio print elements using electro-erosion or spark-erosion machining techniques, thereby making it possible to obtain print elements made of steel.

Electro-erosion machining is a reproduction technique in common use in the motor, aircraft, and nuclear industries, since it makes it possible to obtain very highly accurate machining of materials that are not suitable for machining by any conventional machining techniques (e.g. tungsten carbide). This particular type of machining does not use a cutting tool and it takes place without contact: material is removed by a succession of sparks set up between the piece to be machined and the replica of the shape to be obtained, which replica is electrically conductive and is referred to under these circumstances as an electrode. Machining takes place in machines whose operating cycles are highly automated and which are generally programmable.

A typical electro-erosion machining assembly comprises a generator of intermittent discharges (with the electrical discharges being controlled both in duration and in current) and a frame supporting an electrode (generally made of graphite, brass, or copper) together with a piece to be machined and made of quenched steel. The piece to be machined is fixed in a tank containing a dielectric liquid (generally kerosene) serving to pass the current and to extract the eroded metal, thereby cleaning the gap between the electrode and the piece to be machined. For the work to take place automatically, the electrode must be lowered into the workpiece under servocontrol such that the distance between the electrode and the piece to be machined is maintained at a value corresponding to that thickness of dielectric which can be broken down by the discharges. To this end, the electrode is lowered under servocontrol as a function of the potential difference between the electrode and the piece to be machined.

It is well known in this technique that the rate at which material is removed depends on numerous factors, with the primary factor being the sparking conditions generated by the generator. However, the highest rate at which material can be removed by using powerful sparks at a high recurrence frequency is limited by the desired surface state and by the accuracy with which machining is to be performed.

In practice, in order to obtain a very fine surface state together with high machining accuracy, while nevertheless machining in a short period of time, it is necessary to use several different sparking regimes: roughing; finishing; super-finishing; and polishing.

Both the workpiece and the electrode are subjected to erosion by sparks. However, the difference between the erosion rates on the workpiece and on the electrode depends on the nature of each of them and also on the electrical conditions selected for generating the sparks. By selecting appropriate electrode materials, and by acting on the discharge by varying its duration, its current, and its polarity, it is possible to achieve a high degree of assymetry: e.g. 99% erosion on the workpiece and 0.5% on the electrode. However, under super-finishing and polishing conditions it is difficult to avoid substantial wear on the electrode (about 10%). When excellent machining quality is required, such electrode wear means that electrodes must be replaced progressively as the erosion process moves closer to the polishing stage. For engraving steel, electrodes are generally made of graphite (particularly if high erosion rates are required), but it is also very common to use copper or brass.

The machining performance obtained by electro-erosion is very good. Accuracy within about a micron is easily achieved. The surface state naturally depends a great deal on the sparking conditions: with absolute roughness in microns being about 10 to 20 for roughing, 3 to 5 for finishing, 0.5 for super-finishing, and 0.1 for polishing.

The state of the art is illustrated by U.S. Pat. No. 3,542,993 and by Belgian Patent No. 837 814.

U.S. Pat. No. 3,542,993 describes a technique of making cylindrical punches by means of electro-erosion.

However, the field under consideration is that of cutting out, embossing, stamping, milling, or serrating dies, and not printing. This is important since the degree of accuracy required is quite different: for punches, the desired accuracy is not more than five hundredths of a millimeter at best, whereas for print elements, and a fortiori for intaglio print elements, the desired reproducibility requires an accuracy of five thousandths of a millimeter, i.e. ten times greater.

The mechanical drive means included in the prior art machine for making cylindrical punches would be completely unsuitable for making print elements (see in particular the rack and pinion drive shown in FIG. 15 of the U.S. patent).

It should also be observed that the machine in the U.S. patent seeks, above all, to reduce the time and the cost of making punches, whereas the present invention seeks to make print elements that do not wear out, even if it takes a long time to do so.

Belgian Patent No. 837 814 describes a technique in the field of relief stamping in which a graphic image is engraved on a piece of hard metal by electro-erosion by an electrode including a conducting element on which the image is reproduced by a photogravure technique.

However, here again the field under consideration is very different, and the accuracy requirements are unrelated to those of intaglio printing. For relief stamping it is necessary to obtain an engraving in relief enabling suitable marks to be made, however the required accuracy is at best about half a millimeter.

Thus, the two above-mentioned documents are mentioned as illustrating the technological background of the invention, in particular as illustrating electro-erosion manufacturing techniques in fields which are unrelated to intaglio printing, and in which the degree of accuracy required is small compared with the high degree of fineness required for intaglio print elements.

Further, the summary of prior art techniques for intaglio printing on banknote paper at the beginning of the description of the present application clearly illustrates the complexity of making intaglio print elements, which complexity is naturally not to be found in the field of manufacturing punches for cutting out or for stamping, or in the field of relief stamping.

An essential object of the present invention is to make it possible to duplicate steel print elements, in a manner that is suitable for automation, not only for the purpose of obtaining uniform quality between the print elements made, but also for minimizing, as far as possible, both the time required for obtaining them and the randomness in the process.

SUMMARY OF THE INVENTION

More particularly, the invention provides a method which is remarkable in that it comprises the following successive steps:

(a) starting from an engraved copper artmodel representing the desired print, a copper counterpart is formed by electroforming;

(b) the face of the copper counterpart opposite to its engraved face is machined so as to define a reference plane; and (c) the copper counterpart is used as an electrode in an electro-erosion machining bench in which the steel workpiece to be machined is disposed and presents a cylindrical side face whose axis is parallel to the reference plane, with machining taking place step by step over successive zones by virtue of relative displacements between said workpiece and said electrode during which said axis remains parallel to said reference plane, until intaglio print elements having the desired surface state are obtained.

Preferably, the artmodel is initially flattened and machined on its rear face so that the reference plane is parallel to said face and therefore to the working face on which the artist works.

It is also advantageous to provide for the artmodel used to be engraved slightly bolder than required for obtaining the desired print, thereby keeping sideways access open for fluid flow between the workpiece and the electrode, and thus avoiding the need to brush the electrode on machining each successive zone of the steel workpiece; in particular, the engraving on the artmodel is exaggerated so as to obtain depressions whose depth is increased by several tenths of a millimeter, and preferably by one to two tenths of a millimeter.

Preferably, the cylindrical side face of the steel workpiece is previously rectified and polished.

Advantageously, during the electro-erosion machining step, a non-zero gap is maintained between the electrode and the cylindrical side face of the steel workpiece, said gap being preferably about one to two tenths of a millimeter across.

Preferably, the steel workpiece is capable of rotating through an angular step for the machining of each successive zone of said piece, with the electrode being correspondingly displaced parallel to the reference plane and perpendicularly to the axis of the workpiece through a step size equal to the arc length on the side face of said workpiece corresponding to said angular step; in particular, the displacement step side of the electrode is of the order of a few tenths of a millimeter, and preferably about five tenths of a millimeter. More precisely, during the machining of each successive zone of the steel workpiece, only the electrode is displaced, along a direction perpendicular to the reference plane.

Finally, the method of the invention may have two variants depending on the type of print element desired: it may comprise a method in which the steel workpiece is a plate or a cylindrical sleeve, with the workpiece being mounted for the electroerosion machining step on a cylindrical support whose axis constitutes the axis of the side face of said workpiece, or else it comprises a method in which the steel workpiece is a solid cylinder so as to obtain an intaglio print cylinder directly after electro-erosion machining.

The invention also provides an apparatus for implementing the above-defined method for the purpose of making intaglio print elements out of steel.

The apparatus of the invention comprises an automated electro-erosion machining bench including a programmable rotary device for supporting the steel workpiece and a programmable moving device for supporting the electrode, said devices enabling relative displacements to take place between the workpiece and the electrode such that the axis of the side face of said workpiece remains parallel to the reference plane of said electrode.

Preferably, the rotary device is adjustable along a vertical axis and in rotation about said axis by means of two programmable stepper motors.

Advantageously, the moving device includes a bedplate moveable in a horizontal plane along two reference axes by means of two programmable stepper motors, and an electrode support mounted on the said bedplate in such a manner that the reference plane of the electrode is perpendicular to the plane defined by the reference axes and is parallel to one of said axes; in particular, the electrode support is fixed in a tank containing a dielectric liquid, said tank being moveable in a horizontal plane.

BRIEF DESCRIPTION OF THE DRAWINGS

An implementation of the invention is described by way of example with reference to the accompanying drawings, in which:

FIG. 1 is a diagram illustrating the various steps of a manufacturing method in accordance with the invention;

FIG. 2 is a perspective view showing an apparatus for implementing the method, in particular the electro-erosion machining bench used, with the tank containing the dielectric liquid being represented in part by dot-dashed lines in order to avoid overcrowding the figure; and FIGS. 3a and 3b are diagrams showing two successive machining stages, showing the displacement of the workpiece through one angular step and the corresponding displacement of the electrode parallel to the reference plane, with FIG. 3a showing respective origin positions, by way of example.

MORE DETAILED DESCRIPTION

FIG. 1 is a diagram illustrating the various steps of the method of mass-producing intaglio print elements in accordance with the invention. The steps are represented by blocks each containing a diagram representing the associated product.

Block 1 illustrates prior preparation of a copper plate 2 before the artist has begun to engrave it. The copper plate 2 is flattened and its rear face (its face opposite to its mirror image face on which the artist is going to work) is machined and rectified in order to be parallel to the working face: a plane reference rear face marked (P) is thus defined.

Block 3 represents the copper plate 2 being engraved. The copper plate is partially engraved by etching (caustic), and partially be means of cutting tools (burins) with the engraving being represented by a notch 4.

The method of the invention makes it possible to duplicate intaglio print elements made of steel and reproducing the engraved copper plate (artmodel) representing the desired print. Thus, block 5 shows that a copper counterpart is made from the artmodel 2 by means of an electroforming process. This copper counterpart is obtained by a conventional electrotype technique and as a result this stage of the method does not require describing in greater detail. On leaving the copper electroforming bath, the electroplating growth face of the counterpart-artmodel sandwich, which face is referenced 8, is relatively irregular.

Block 7 indicates that after engraving and on leaving the electroforming bath, the counterpart 6—artmodel 2 sandwich is rectified on the electroplating growth face 8 of the sandwich in order to ensure that this face is parallel to the back of the artmodel which corresponds to the reference plane (P). The rectified face is thus referenced (P'), with said face constituting a new reference plane for the subsequent electro-erosion machining step, it being understood that this new reference plane (P') which is parallel to the face (P) is therefore also parallel to the working face on which the artist worked.

In accordance with an essential aspect of the method of the invention, the copper counterpart 6 is used as an electrode in an electro-erosion machining bench in which the steel workpiece to be machined is disposed, as represented by block 9. This block shows an electrode support 10 having a face 11 against which the electrode-forming copper counterpart 6 is disposed, with the rear face (P') of the counterpart being applied against said face 11. The cylindrical side face 12 of the steel workpiece can also be seen, with the axis of said cylindrical side face being parallel to the reference plane (P') and perpendicular to the plane of the figure. Electro-erosion machining takes place step by step over successive zones by virtue of relative displacement between the workpiece and the electrode, during which the axis of the cylindrical side face remains parallel to the reference plane (P') until the intaglio print element(s) having the desired surface state have been obtained. Reference axes x, y, and z, and the angle of rotation $\theta$ of the steel piece to be machined about the vertical axis z are shown diagrammatically. The relative movements between the workpiece and the electrode will be better understood after referring to the following description made with reference to FIGS. 2, 3a, and 3b. The steel workpiece is mounted to rotate through an angular step $\theta$ in order to enable each successive zone of said workpiece to be machined, with the electrode 6 being displaced by a corresponding amount parallel to the reference plane (P') and perpendicularly to the axis of the workpiece, through a step equal to the length of the arc through which the corresponding portion of the side face 12 of said workpiece moves due to said angular step.

Blocks 13, 15, and 17 recall diagrammatically that it is possible to use different types of steel workpieces depending on the desired type of intaglio print element. Thus, the piece may be a plate 14, a cylindrical sleeve 16, or a solid cylinder 18. If the workpiece is a plate or a cylindrical sleeve, it is mounted during the electro-erosion machining step on a conventional cylindrical support whose axis constitutes the axis of the side face 12 of said piece. When the workpiece is a solid cylinder 18, an intaglio print cylinder is obtained directly after electro-erosion machining. Steel intaglio print elements obtained after electro-erosion machining are shown in blocks 19, 21, and 23, and the corresponding print elements, i.e. plate 20, cylindrical sleeve 22, and solid cylinder 24, are shown bearing a mirror image letter B in order to recall that this is a negative print method. Naturally, the resulting print plate 20, or cylindrical sleeve 22 is subsequently mounted in conventional manner for the purpose of constituting a print cylinder.

Given the high degree of accuracy required for this type of printing, all of the items concerned must be prepared as well as possible for this purpose. Thus, the cylindrical side face of the steel workpiece, be it a plate, a cylindrical sleeve, or a solid cylinder, is preferably previously rectified and polished. Further, small imperfections may result from the stage of obtaining a copper counterpart during the electroforming process. Very small shavings may remain in the depressions of the electrode after electroforming, and such shavings tend to adhere to the surface and may give rise to short circuits which are damaging during the electro-erosion machining step. This makes it necessary to maintain a non-zero gap between the electrode and the cylindrical side face of the steel workpiece, with said gap being preferably about one or two tenths of a millimeter. Further, given the small engraving depths and the distribution of depressions on a plate, it is normally necessary to brush the electrode for each successive electro-erosion machining pass. To this end, within the context of the invention, one particular implementation makes it possible to avoid such repeated operations of brushing the electrode: to do this, the engraved depressions 4 in the artmodel 2 are slightly bolder than required in the final print. For example the engraving may be exagerated to obtain depression which are several tenths of a millimeter deeper than would normally be required, e.g. one to two tenths of a millimeter. In this way, excellent results are obtained since by preserving sideways access in this way the fluid can circulate properly between the electrode and the workpiece to be engraved. Each successive zone of the steel workpiece is then machined using an electrode displacement step size of a few tenths of a millimeter, and preferably about five tenths of a millimeter, with said steel workpiece rotating through an angular step of a few tenths of a degree. During the machining per se of each successive zone of the steel workpiece, the electrode is preferably displaced on its own along a direction perpendicular to the reference plane (P').

The method of the invention thus makes it possible to develop a method of engraving which is faithful, accurate, and capable of being automated, and is suitable for being used for engraving the hardest grades of steel by using electro-erosion. FIG. 2 makes it easier to understand how this fundamental step of electro-erosion machining progresses during which a copper counterpart of the artmodel is used as the electrode. The illustrated machine 25 includes a programmable central control unit 26 for monitoring the various operating parameters and for automatically controlling mass production of intaglio print elements.

Basically, the automated electro-erosion machining bench comprises a programmable rotary device 27 supporting the steel workpiece, and a programmable moving device supporting the electrode 23, with said devices providing relative displacements between the workpiece and the electrode such that the axis of the side face of said workpiece remains parallel to the reference plane (P') of said electrode. The piece of steel to be engraved may be in the form of a plate, of a cylindrical sleeve, or of a solid cylinder. When it is in the form of a plate or of a cylindrical sleeve, the piece of steel is mounted by conventional means on a cylindrical support for reconstituting a cylinder suitable for being fixed on the programmable rotary device of the machining machine. When the workpiece is a solid cylinder, then the connection means of the rotary device need adapting to ensure that the workpiece rotates accurately about its axis. FIG. 2 shows a cylindrical support 28 on which a plate is mounted with the cylindrical side surface of the plate being referenced 35. The piece of steel is rectified and polished (mirror polishing), and it is mounted in such a manner that for a diameter of about 150 mm, its out-of-true does not exceed ±two hundredths of a millimeter. This mounting is fixed to the device 27 of the machining machine, thereby enabling position along the vertical axis z'-z to be adjusted and also allowing it to rotate about said axis (as shown by arrow 40) by means of two programmable stepper motors (not shown). A moving programmable device is also provided supporting the electrode 32, and in this case this device comprises a bedplate 29 capable of moving in a horizontal plane along two reference axes x'-x and y'-y by means of two programmable stepper motors (not shown), and an electrode support 31 mounted on said bedplate in such a manner that the reference plane (P') of the electrode is perpendicular to the plane defined by the reference axes x'-x and y'-y, and is parallel to one of said axes (y'-y). In practice, the electrode support 31 is fixed in a tank 30 containing a dielectric liquid, with said tank being moveable in a horizontal plane. In this case, the supporting bedplate 29 is merely the bottom of the tank. FIG. 2 shows an impression 33 (positive and in relief) appearing on the outside face of the electrode 32, thereby making it possible to obtain the desired impression 34 (negative and comprising depressions) on the cylindrical face 35 of the workpiece by virtue of machining which takes place step by step in successive zones.

For example, for a plate of size 80 mm × 160 mm, a thickness of 4 mm suffices for ensuring that it is adequately stiff and that it is accurately positioned in the electro-erosion installation. It is important to recall that the electrode is rectified on its face opposite to the engraving and with reference to the reference plane of the artmodel, such that the reference plane of the artmodel is preserved in the context of the method of the invention. The reference plane (P') is naturally used for fixing the electrode to the bedplate 29, with the reference plane (P') being parallel to the axis z'-z about which the steel workpiece rotates.

FIGS. 3a and 3b show how the successive electro-erosion machining stages progress by showing the displacement of the workpiece through one angular step and the corresponding of the electrode parallel to the reference plane.

In FIG. 3a, the electrode 32 is positioned relative to the surface 35 of the steel workpiece in such a manner that the origins of the engraving (in relief) on the electrode (point B1) is level with the origins of the engraving (as a depression) to be obtained on the steel workpiece (point A1). It is recalled that the electrode 32 is capable of moving along the axis y'-y parallel to the reference plane (P'), or else along the axis x'-x by moving towards the steel workpiece. This piece is referenced solely by its angle parameter $\theta$, given that its z parameter is fixed once and for all, after adjustment, prior to beginning with electro-erosion machining. The distance A1-B1 corresponds to the gap between the electrode and the cylindrical side face of the steel workpiece, and this gap is reduced to a very small (but not zero) working gap during the electro-erosion machining operation. This small gap is preferably about one to two tenths of a millimeter. When the first machining sequence is performed, the electrode is moved away from the cylinder and each element moves through one step: the workpiece rotates through an angle $\theta$ about the axis z, and the electrode 32 is displaced parallel to the axis y'-y through a distance B1-B2 which is equal to the arc length A1-A2 on the cylinder. By way of example, a displacement step size of about five tenths of a millimeter is selected for the electrode (segment B1-B2) which corresponds in a cylinder having a diameter of 150 mm to an angular step size of about four tenths of a degree for the steel workpiece (angle $\theta$). The position shown in FIG. 3b is reached in this way. Once these two movements have been performed, the electrode 32 is again displaced along the axis x'-x towards the cylindrical side surface 35 of the workpiece so that electro-erosion machining is begun again, but now in the vicinity of generator line A2 on the cylinder. The process is then repeated until the entire desired print has been obtained. By way of example, about ten hours are required to complete the electro-erosion machining stage of an electrode of dimensions 80 mm × 160 mm. However, the duration of this stage is nevertheless relatively short compared with the time required for obtaining a copper counterpart by electroforming. Four to five days are generally required for obtaining a copper counterpart having a thickness of 5 mm to 6 mm, with the extra thickness being required to obtain an electrode which is 4 mm thick after machining and rectification to ensure that its rear face is parallel to its working face.

The method and the apparatus of the invention provide extremely effective results, in an entirely automated manner, since it is easy to obtain intaglio print elements having an absolute roughness of less than 0.5 microns.

By virtue of this manufacturing technique, it is possible to obtain steel print elements having very considerable advantages:

wear due to scraping and wiping can be kept under control by the selected grade of steel;

there is no difficulty in preparing the ink-receiving surface to the required degree of polishing; and it is no longer necessary to chromium plate the printing surfaces.

This provides print elements which do not wear out and which do not require special maintenance, whereas engraving by means of a cutting tool under mechanical control has so far not given rise to an industrial installation.

Naturally the invention is not limited to the embodiments described above, and on the contrary it covers any variant which uses equivalent means to reproduce the essential characteristics appearing in the claims.

What is claimed:

1. A method of duplicating steel intaglio print elements, the method comprising the following steps in succession:
   (a) engraving a copper artmodel according to a desired print, but slightly deeper than required for obtaining said desired print;
   (b) utilizing the engraved copper artmodel to produce a copper counterpart by electroforming;
   (c) machining the face of the copper counterpart opposite to its engraved face to define a reference plane; and
   (d) using the copper counterpart as an electrode in an electro-erosion machining bench in which a steel workpiece to be machined is disposed and presents a cylindrical side face whose axis is parallel to the reference plane, with machining taking place step by step over successive zones by virtue of relative displacements between said workpiece and said electrode during which said axis remains parallel to said reference plane, until intaglio print elements having the desired surface state are obtained.

2. A method according to claim 1, wherein the artmodel used is initially flattened and machined on its rear face so that the reference plane is parallel to said face and therefore to the working face on which the artist works.

3. A method according to claim 2, wherein the engraving on the artmodel is exaggerated so as to obtain depressions whose depth is increased by approximately one to two tenths of a millimeter.

4. A method according to claim 1, in which the steel workpiece is a solid cylinder, thereby enabling an intaglio print cylinder to be directly obtained after electro-erosion machining.

5. A method according to claim 1, wherein the cylindrical side face of the steel workpiece is previously rectified and polished.

6. A method according to claim 1, wherein during the electroerosion machining step, a non-zero gap is maintained between the electrode and the cylindrical side face of the steel workpiece, said gap being preferably about one to two tenths of a millimeter across.

7. A method according to claim 1, wherein the steel workpiece is capable of rotating through an angular step for the machining of each successive zone of said piece, with the electrode being correspondingly displaced parallel to the reference plane and perpendicularly to the axis of the workpiece through a step size equal to the arc length on the side face of said workpiece corresponding to said angular step.

8. A method according to claim 7, wherein the displacement step side of the electrode is of the order of about five tenths of a millimeter.

9. A method according to claim 7, wherein during the machining of each successive zone of the steel workpiece, only the electrode is displaced, along a direction perpendicular to the reference plane.

10. Apparatus for duplicating steel intaglio print elements, comprising:
    (a) means utilizing an engraved copper artmodel engraved according to a desired print, but slightly deeper than required for obtaining said desired print, for producing a copper counterpart by electroforming;
    (b) means for machining the face of the copper counterpart opposite to its engraved face to define a reference plane; and
    (c) means including an automated electro-erosion machining bench using the copper counterpart as an electrode therein and in which a steel workpiece to be machined is disposed and presents a cylindrical side face whose axis is parallel to the reference plane, with machining taking place step by step over successive zones by virtue of relative displacements between said workpiece and said electrode during which said axis remains parallel to said reference plane to obtain intaglio print elements having the desired surface state, said automated electro-erosion machining bench including a programmable rotary device for supporting the steel workpiece and a programmable moving device for supporting the electrode, said rotary and moving devices enabling relative displacements to take place between the workpiece and the electrode such that the axis of the side face of said workpiece remains parallel to the reference plane of the electrode.

11. Apparatus according to claim 10, wherein the rotary device is adjustable along a vertical axis and in rotation about said axis by means of two programmable stepper motors.

12. Apparatus according to claim 11, wherein the moving device includes a bedplate moveable in a horizontal plane along two reference axes by means of two programmable stepper motors, and an electrode support mounted on the said bedplate in such a manner that the reference plane of the electrode is perpendicular to the plane defined by the reference axes and is parallel to one of said axes.

13. Apparatus according to claim 12, wherein the electrode support is fixed in a tank containing a dielectric liquid, said tank being moveable in a horizontal plane.

* * * * *